Feb. 18, 1958      I. V. ZOZULIN      2,824,244
MAGNETIC BRAKE CONTROLLED MAGNETIC COUPLINGS
Filed May 16, 1955
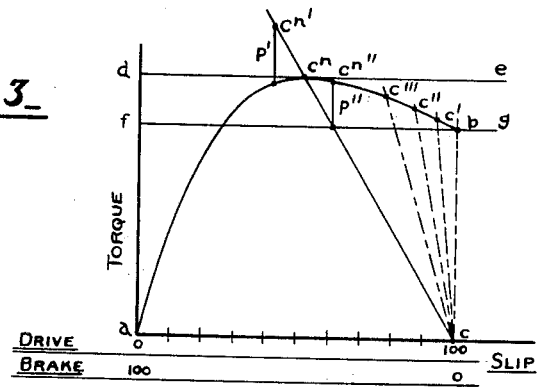
Fig. 3.
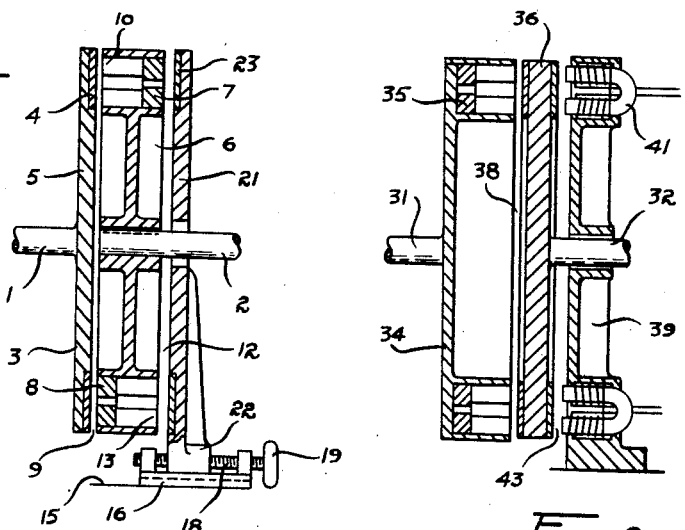
Fig. 1.
Fig. 2.
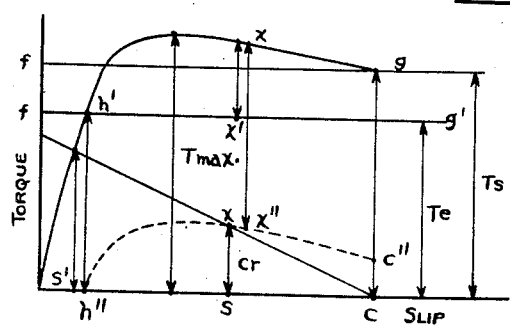
Fig. 4.
INVENTOR
IGOR V. ZOZULIN
ATTORNEY

United States Patent Office 2,824,244
Patented Feb. 18, 1958

2,824,244

MAGNETIC BRAKE CONTROLLED MAGNETIC COUPLINGS

Igor V. Zozulin, Vancouver, British Columbia, Canada, assignor to Tormag Transmissions Limited, Vancouver, British Columbia, Canada Application May 16, 1955, Serial No. 508,611

7 Claims. (Cl. 310—96)

My invention relate to improvements in magnetic brake controlled magnetic couplings.

The object of the present invention is to provide a magnetic coupling which is equipped with a magnetic brake having the characteristic of functioning automatically without mechanical adjustment to resist the tendency of said coupling to speed up or slow down due to load variation.

A further object of the invention is to provide a coupling which can be manually adjusted to run at a constant torque within a given range of speeds.

A still further object is to provide a brake by which the speed of the driven rotor may be reduced susbtantially to a standstill without overloading the motor driving the input or drive rotor.

Referring to the accompanying drawings:

Figure 1 is a sectional view taken susbtantially along the longitudinal axis of the coupling.

Figure 2 is a similar sectional view showing the use of electromagnets in the magnetic brake of a modified form of the clutch.

Figure 3 is a diagram which represents the torque characteristics of a coupling formed with a drive and driven rotor, where both rotors are provided with magnets opposing each other.

Figure 4 is a diagram showing torque and load relationship under conditions of useful power output.

In the drawings like characters of reference indicate corresponding parts in each figure.

The numerals 1 and 2 indicate respectively aligned input and output shafts. The shaft 1 is fitted with a circular disk 3 of metal of magnetic permeability having an annular band 4 of metal of electrical conductivity to form a bimetallic rotor 5. Opposing the bimetallic rotor 5 is a magnetic rotor 6 which is fitted upon the shaft 2 and is provided at its periphery with an annulus 7 of permanent horseshoe magnets 8, which are spaced from the rotor 5 to define a fixed air gap 9. Some of the magnets of the annulus 7 are arranged with their pole pieces facing the air gap 9 as at 10 and others of said magnets have their pole pieces facing in the opposite direction, or facing a second and variable air gap 12 as at 13, see Figure 1.

In the embodiment here shown, the ratio of magnets facing the air gap 9 to the magnets facing the air gap 12 is one to three. Concentrically mounted from a support 15 is a guide 16 having a horizontal feed screw 18 fitted with a hand wheel 19 and slidably carried upon the guide is an endwise movable non-rotative brake member 21 having an integral nut 22 at its base which is engaged by the feed screw to enable the non-rotative brake to be moved longitudinally of the shaft 2 to vary the width of the air gap 12. The brake is fitted with an annular band 23 of electrical conductive metal to form a bimetallic member coacting with the magnets facing the air gap 12 to provide a retarding influence upon the driven magnetic rotor 6.

In the modification shown in Figure 2, the aligned input and output shafts are respectively indicated by the numerals 31 and 32. The shaft 31 is fitted with a magnetic drive rotor 34 having an annular row of permanent magnets 35 all having their pole pieces facing towards a trimetallic rotor 36 which is fitted upon the shaft 32 and is spaced from the row of magnets to define an air gap 38 of appropriate width. Non-rotatably supported from a fixed part of the coupling is a brake member 39 having an annular row of electromagnets 41 which have their pole pieces spaced from the trimetallic rotor 36 and define a second air gap 43.

The adjustment of the coupling as shown in Figure 1 to cause it to carry its load within a given speed range is accomplished by moving the brake member 21 relative to the magnetic rotor 6 by means of the hand wheel 19 and the manner in which the coupling, as shown in Figure 2, is adjusted is by progressively increasing or decreasing the magnetic flux in the magnets 41, so as to set the coupling to run within a predetermined rate of speed and develop a given torque. It will be readily understood that the brake member 21 would be just as efficient if it were hingedly mounted and swung upon a pin to move towards and away from the driven or magnetic rotor 6 and give substantially the same results.

In the operation of the coupling shown in either of Figures 1 and 2, the fundamental change between the ordinary magnetic coupling lies in the use of a braking element which is adjustable to vary the output speed but not alter the torque output of the coupling. It will be noted that in the structure of Figure 1 there are two air gaps, the gap 9 being of a constant width and the gap 12, which is variable, and that by changing the gap 12 the speed of rotation of the driven rotor 6 is changed, but that the torque developed does not change. When the air gap 12 is reduced to a minimum the magnetic rotor will barely turn, though the bimetallic or drive rotor 5 will maintain its full speed and as the gap is progressively widened the rotor 6 will pick up speed until it is turning at substantially the same speed as the drive rotor 5. Since the retarding action of the brake is dependent on both air gap and the amount of slip in the device as in Figure 1, and by air gap and variation of magnetic flux of the brake member 39 of Figure 2, it will be seen that the braking effect of the present magnetic brake will be widely different from that of any friction brake, for instance for any given width of air gap 12, as the rotation slows down the slip between the rotor 6 and the brake member 21 is reduced and the effectiveness of the brake is also reduced and conversely as the slip between the driven rotor 6 and the brake member increases, so also the braking action increases.

In the case of the modification of Figure 2, where the flux is increased in the magnets 41 the result is exactly the same as in the device of Figure 1. The selection of the relative width of the variable air gap, or alternately the variation of flux developed in the electromagnets of Figure 2 determines and maintains the output speed and this output speed can be selected and set for various loads within very wide limits.

The principles involved in this device are shown in the diagram of Figure 3, wherein the vertical axis represents torque in foot pounds, and the horizontal axis shows slip in feet per second between rotor 5 and rotor 6 (drive slip) and slip in feet per second between rotor 6 and brake member 21 (brake slip). It is clear that their sum is constant, i. e. one is at its maximum when the other is at its minimum and vice-versa. The curve $a$—$b$ represents the torque characteristics of the coupling formed by the rotor 5 and that portion of the rotor 6 having magnets facing the rotor 5. Curves $c$—$c'$, $c$—$c''$, $c$—$c'''$, etc. are successive curves expressing torque relationships between the brake member 21 and the corresponding portion of the rotor 6 for different air gaps between the rotor 6 and said brake member. The curve a—b and the visible portion of the c—c curves are different because of different numbers of magnets used. Line d—e represents the maximum torque value for a given motor at its rated H. P. and R. P. M. Line f—g represents the selected maximum torque for the coupling 5—6. Normally the position of this line is selected so that this operating torque f—g is 95% of the maximum operating torque of the motor (d—e). The line d—e is so selected that it is impossible to overload the motor. That is the entire device is capable of transmitting from 95%, and even up to the full 100% of the maximum torque d—e if the characteristic curve a—b of the coupling 5—6 is of constant torque, i. e. has a flat end portion.

At any point $C^n$ where the lines $c—c^n$ and the curve a—b intersect the torques of coupling 5—6 and brake 6—21 are equal, and therefore no surplus torque is available, and the output speed of rotor 6 becomes fixed. This is so because if the speed of rotor 6 is increased the point $c^n$ will move to point $c^{n'}$ the torque of the brake will increase in value by $p'$ over that of coupling 5—6, thus tending to reduce its speed and bring it back to point $c^n$, and similarly if we reduce the speed of rotor 6, the point $c^n$ will move to the point $c^{n''}$ and the value of brake torque will be reduced by amount $p''$ thus tending to increase its speed and again bring point $c^{n''}$ back to $c^n$.

The diagram shown in Figure 4 shows a torque and load relationship under conditions of useful power output. This diagram is similar to that shown in Figure 3, the line f—g representing the value Ts of the torque which can be transmitted by a given coupling under fully stalled conditions, which may for example be 95% of the maximum torque Tmax. The diagram shows that it is possible to drive a constant torque load of any given torque Te under widely different speeds of the rotor 5, using the brake as an additional load for this purpose.

The line f—g' represents the given load torque Te and the point h' gives the highest speed or lowest slip between drive rotor and driven rotor at which the load may be rotated.

The difference in torque between the curve h'—g must be counteracted by the brake torque, and has therefore been replotted as the dotted line h''—C''.

To drive the load at some predetermined speed or slip S, we must absorb the torque Cr denoted by Sx or x'—x in the brake, leaving the constant torque Te denoted by x—x'' to be transmitted to the load. By drawing the brake torque slip curve to pass through the point x'' we arrive at the width of the air gap 12 needed with the device as in Figure 1 or the amount of energization to be put into the electromagnets 41 of the device shown in Figure 2. Should we remove the load, the setting of air gap or amount of energization of magnets 41 will allow the driven rotor to rotate at a speed corresponding to S'.

What I claim as my invention is:

1. A magnetic brake controlled magnetic coupling comprising a drive rotor and a driven rotor mounted upon aligned shafts and a non-rotative annular member mounted concentrically with the drive and driven rotors, said drive rotor having an annulus of magnetic material to form an armature, said non-rotative member being an armature, said driven rotor having an annulus of permanent magnets, some of said magnets having their pole pieces facing the drive rotor armature and separated by a predetermined air gap therefrom and others of said magnets having their pole pieces facing towards the non-rotative armature and spaced therefrom, the spacing of the magnets from their armatures being such that flux flows simultaneously from the first-mentioned magnets to the drive armature and from the second-mentioned magnets to the non-rotative armature.

2. A magnetic brake controlled magnetic coupling as claimed in claim 1, wherein the drive and driven rotor constitute a coupling and the driven rotor and the non-rotative armature constitute a brake for the coupling, the coupling magnets being disposed to supply a greater flux flow than the brake magnets.

3. A magnetic brake controlled magnetic coupling as claimed in claim 1, wherein all the magnets lie in a single plane with the first-named magnets alternating with the second named magnets in the annulus of permanent magnets.

4. A magnetic brake controlled magnetic coupling as claimed in claim 1, wherein the first-named magnets and the second-named magnets perform their several functions automatically.

5. A magnetic brake controlled magnetic coupling as claimed in claim 1, wherein the second-named magnets are in greater number than the first-named magnets.

6. A magnetic brake controlled magnetic coupling as claimed in claim 1, wherein the non-rotative member is carried in a stationary guide extending parallel to the aligned shafts and means are provided for moving said non-rotative member axially towards the driven rotor to vary the air gap between the non-rotative armature and the second-named magnets.

7. A magnetic brake controlled magnetic coupling adapted to be driven by an electric motor having a safe load torque, said coupling comprising a drive rotor and a driven rotor mounted upon aligned shafts and a non-rotative annular member mounted concentrically with the drive and driven rotors, said drive rotor being an armature, said non-rotative member being an armature, said driven rotor having a first set of permanent magnets facing and in continuous cooperative relation with the drive rotor, said driven rotor having a second set of permanent magnets facing and in continuous cooperative relation with the non-rotative member to restrain the rotation of the driven rotor, the drive rotor armature and the first set of magnets of the driven rotor being correlated to produce stall condition before the motor reaches its safe load torque and the non-rotative armature and the second set of magnets of the driven rotor being correlated to limit the speed of the driven rotor while maintaining the torque output of the coupling.

References Cited in the file of this patent

UNITED STATES PATENTS

| | | |
|---|---|---|
| 653,424 | Lunt | July 10, 1900 |
| 1,476,458 | Murray | Dec. 4, 1923 |
| 1,802,630 | Cotal | Apr. 28, 1931 |
| 2,560,868 | Hubert | July 17, 1951 |

FOREIGN PATENTS

| | | |
|---|---|---|
| 9,111 | Great Britain | of 1902 |
| 675,379 | Great Britain | July 9, 1952 |